United States Patent [19]

Cleland

[11] 4,280,401
[45] Jul. 28, 1981

[54] BREW RAIL ADAPTER

[76] Inventor: Robert K. Cleland, 11051 Via El Mercado, Los Alamitos, Calif. 90720

[21] Appl. No.: 93,385

[22] Filed: Nov. 13, 1979

[51] Int. Cl.³ .............................................. A47J 31/10
[52] U.S. Cl. ..................................... 99/295; 248/298
[58] Field of Search ................. 99/295, 281, 298, 282, 99/283, 290, 291, 304, 306; 248/298, 312.1, 312; 211/74

[56] References Cited

U.S. PATENT DOCUMENTS

| 2,512,502 | 6/1950 | Paschell | 248/312 |
| 2,633,323 | 3/1953 | Burger | 248/312 |
| 3,793,935 | 2/1974 | Martin | 99/295 |
| 3,978,778 | 9/1976 | Roberts | 99/281 |
| 4,008,656 | 2/1977 | Gruner | 99/298 |

Primary Examiner—Robert W. Jenkins
Attorney, Agent, or Firm—Georges A. Maxwell

[57] ABSTRACT

An adapter to releasably engage a small brew cone for a small coffee brewing machine with the cone engaging rails of a large coffee brewing machine; said coffee brewing machine has a hot water dispensing head with a bottom surface, a water discharge opening at that surface and a pair of elongate parallel brew rails spaced below said surface at opposite sides of the discharge opening to engage and support the rim flange of a large brew cone; said small brew cone is an upwardly opening cup-like unit with an outwardly projecting rim flange less in diameter than the space between the brew rails; said adapter is a flat plate-like unit with flat upper and lower surfaces, opposite side edge portions engaged above the brew rails, a center opening registering with the discharge opening and a pair of elongate parallel brew rails spaced below said lower surface and at opposite sides of the center opening and slidably engaged below and supporting the rim flange of the small brew cone; the side edge portions of the plate have retaining means yieldingly frictionally engaging the brew rails of the machine and urging the plate into engagement with said bottom surface; the plate has a plate orienting flange to engage the head of the machine and a cone orienting flange to engage the cone and to stop the plate and the cone in predetermined position relative to the machine and to each other.

7 Claims, 9 Drawing Figures

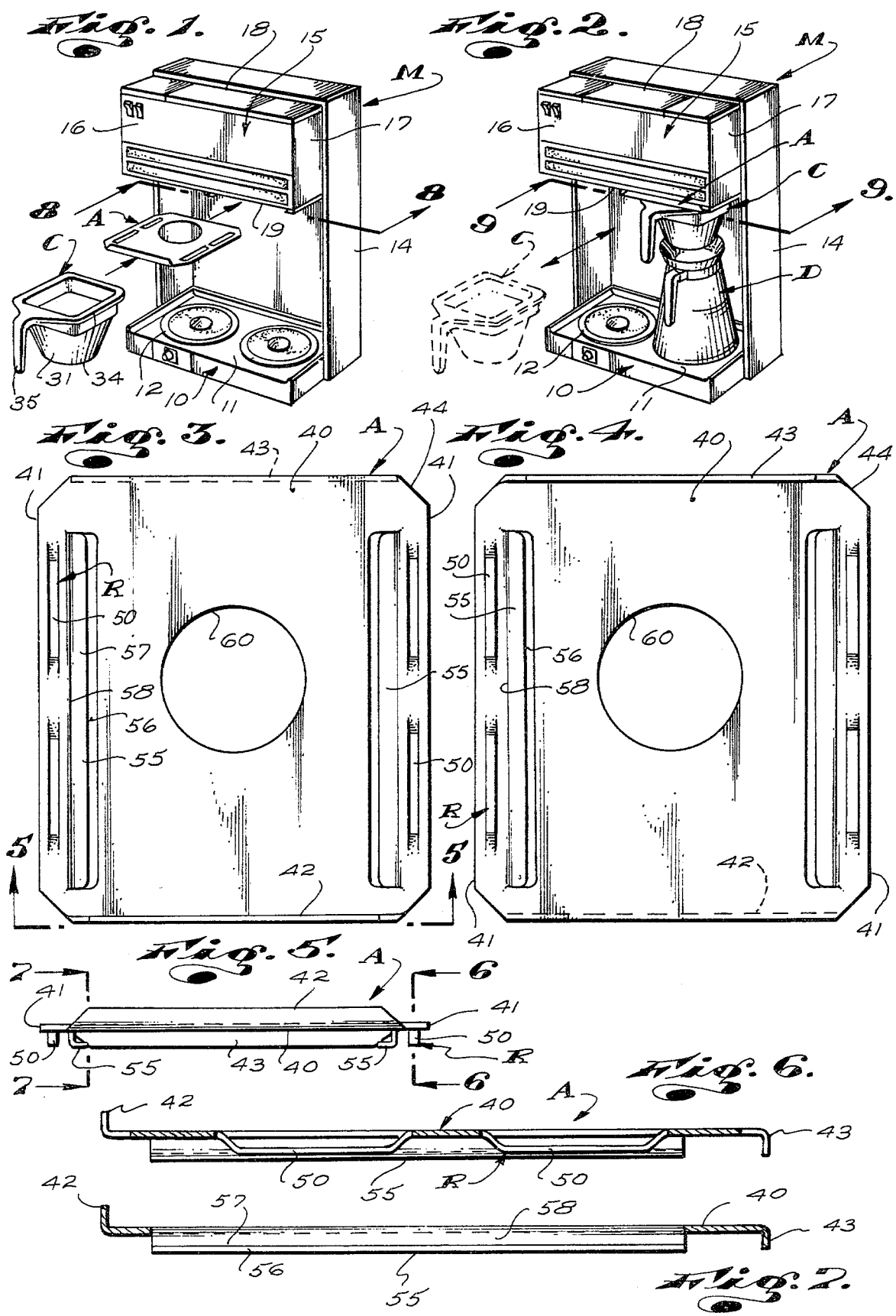

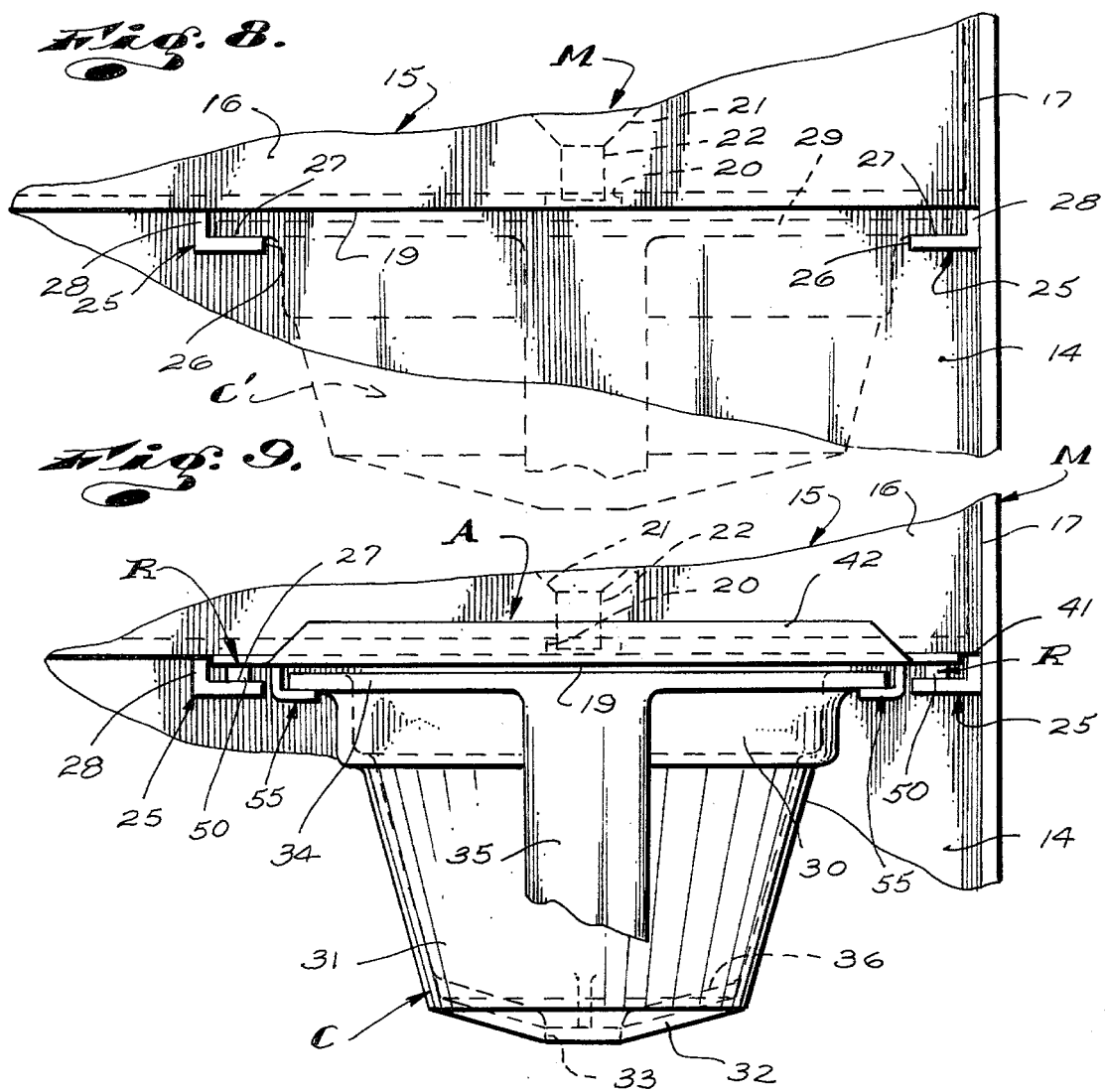

BREW RAIL ADAPTER

This invention has to do with a coffee brewer and is particularly concerned with a brew rail adapter in combination with a brew machine of one size and capacity and a brew cone for a machine of lesser size and capacity.

BACKGROUND OF THE INVENTION

In the coffee brewing art, one type or class of commercial coffee brewing machine is most commonly used. Machines of the referred to class of machines comprise flat, horizontal bases with front, rear and side edges and horizontal upwardly disposed trays upon which one or a pair of coffee decanters can be set and which are oftentimes provided with electric heating elements to maintain the coffee filled decanters warm. These machines next include vertical columns projecting upwardly from the rear sides of the bases and have forwardly projecting heads on the upper ends of the columns, overlying the bases and the upper open ends of the decanters supported thereby. The heads carry hot water supplies which hold predetermined volumes of hot water sufficient to brew one batch or full decanter of coffee. The hot water supplies have water discharge openings or ducts opening at the bottoms of the heads, above and in vertical alignment with the decanters arranged on the trays to receive brewed batches of coffee. In some of these machines, the water supplies must be manually filled with hot water through access openings at the tops of the heads while in other machines, the hot water supplies includes means to automatically replenish the supplies of water and electric resistance heaters to suitably heat the water.

The heads of the above noted class of machines have flat horizontal downwardly disposed bottom walls, or equivalent structure, with vertical through openings through which the water discharged by the hot water supplies is free to flow, or into and through which the discharge ducts of the water supplies freely project. The bottom walls, or equivalent structure, of the heads have a pair of elongate horizontal laterally spaced parallel brew rails which extend fore and aft and occur in limited predetermined spaced relationship below those bottom walls or structure. The brew rails occur at opposite sides of the water discharge and through openings and slidably receive and support opposite side portions of rim flanges at the upper ends of upwardly opening cuplike brew cones. The brew cones carry predetermined measured volumes of roasted and ground coffee beans, sufficient for brewing one batch. The upwardly opening cup-like brew cones have bottom walls with central coffee discharge openings which occur in spaced vertical relationship above the open upper ends of coffee decanters positioned on the trays of the machines to receive fresh brewed coffee.

In operation, when a batch of coffee is to be brewed, a brew cone containing a measured volume of ground roasted coffee beans (hereinafter called "ground coffee") deposited therein is slidably engaged with the brew rails and is supported thereby beneath the head of the machine, to receive hot water discharged by the hot water supply and a decanter is arranged on the tray of the machine to receive freshly brewed coffee flowing from the cone. When the cone and decanter are thus arranged, the supply of hot water is caused to flow from the head into the cone. The water percolates down through the bed of ground coffee beans within the cone, extracting flavor and essence therefrom. The coffee brewed within the cone flows out through the opening in the bottom thereof and into the decanter.

The above noted class of brew machines have become substantially standardized with respect to the volumes of coffee brewed each time the machines are operated and with respect to the volumes of ground coffee beans that must be used for the effective operation of the machines and the brewing of satisfactory batches of coffee; that is, brews of coffee which have desirable and acceptable flavor, aroma, texture and color.

As a result of standardization of the foregoing noted class of coffee brewing machines, there are two basic sizes of machines; one size being especially designed and operable to make ten 6 ounce cups or 60 ounce batches of coffee and the other size being especially designed and operable to make eight 6 ounce cups or 48 ounce batches of coffee. The larger ten cup machines are provided with large brew cones especially designed and serviceable to receive and hold approximately 2½ ounces of ground coffee while the smaller eight cup machines are provided with small brew cones especially designed and suitable to receive and hold approximately 1½ ounces of ground coffee. A further result of standardization of the noted class of machines is that the lateral displacement, length and vertical placement of the brew rails for the larger ten cup machines and the vertical extent of the brew cones for those machines have become standardized. The same is also true in the case of the smaller brew cones for the most common makes of eight cup machines. The brew rails for the eight cup machines are shorter and closer together and the brew cones for those machines are narrower than the brew rails for the larger ten cup machines, with the result that the larger ten cup machines, of like make, will not receive and support the smaller brew cones and vice-versa.

The machines referred to above became standardized when coffee beans were in plentiful supply, inexpensive and when roasting and grinding of the beans could be and were based upon what has become an extravagant and uneconomical use of beans.

As a result of oftentimes limited supplies of coffee beans and as a result of the present and increasing high cost of coffee beans, the producers of roasted and ground coffee beans are now producing what is referred to as "high yield" coffee. High yield coffee is such that a greater number of cups of good and acceptable coffee can be brewed from a lesser quantity of ground coffee than was previously possible.

To make high yield coffee, the beans are roasted and blended differently, are sometimes ground differently and the grindings are oftentimes rolled or pressed into a flake-like condition, whereby extraction of the flavors and essence therefrom is notably enhanced when the brewing of coffee therewith is carried out.

While 2½ ounces of regular ground coffee is required to brew ten 6 ounce cups or 60 ounces of good and acceptable coffee, it is possible to brew an equal volume of comparable coffee with but 2 ounces of high yield ground coffee. The economic savings to be gained through the use of extended ground coffee (compared with the use of regular ground coffee) is apparent and can add up to substantial cost savings or increased profit in commercial establishments where large volumes of brewed coffee are sold.

Two ounces of high yield ground coffee in the large brew cones for ten cup brew machines may not be satisfactory since those cones are large in diametric extent and define a large effective surface area over which the ground coffee must be deposited. Due to the large effective surface area of such cones, 2 ounces of extended coffee establishes a bed of ground coffee which is too thin or shallow to allow for effective percolation of hot water therethrough and the effective extraction of the flavor and essence therefrom.

In order to effectively brew ten cups of coffee with 2 ounces of high yield coffee, the bed of ground coffee through which the hot water is percolated must be considerably deeper than the bed such a volume of coffee can establish in a brew cone designed to effectively receive 2½ ounces of ground coffee.

The inventor of the present invention determined that a small or eight cup brew cone, for eight cup coffee brewing machines, which is designed to effectively hold 2 ounces of regular ground coffee would be most effective to produce ten cups of coffee if such a brew cone were to be made to fit a twelve cup brewing machine or if a ten cup brewing machine was modified and made to accept a 2 ounce or eight cup brew cone. It was then determined that to make and effect distribution of special, small brew cones, adapted to receive 2 ounces of ground coffee, for large standard ten cup machines, or to modify existing or make new ten cup machines to accept standard, small, eight cup or 2 ounce brew cones, would be economically prohibitive and impractical. As a result of the above, it was determined that an adapter effective to relate a small standard eight cup brew cone with a standard, large ten cup coffee brewing machine was needed.

OBJECTS AND FEATURE OF THE INVENTION

It is an object and feature of my invention to provide a novel adapter for relating a standard, small, eight cup brew cone with a large, standard ten cup coffee brewing machine.

It is another object and feature of the invention to provide an adapter of the character referred to above comprising a thin flat horizontal sheet metal plate with opposite side edges to cooperatively engage the brew rails of a standard ten cup brewing machine and having a pair of brew cone rails to cooperatively receive and support a standard eight cup brew cone.

Yet another object and feature of this invention is to provide an adapter of the general character referred to above including retaining means to releasably retain the adapter in working position in and with a related brew machine as and when brew cones are moved into and out of engagement with the adapter.

It is another object and feature of the invention to provide an adapter of the general character referred to above wherein said brew cone rails to engage a small brew cone are formed integrally with the adapter by punching and forming sheet metal stock of the adapter plate and wherein the releasable retaining means includes resilient pressure shoes or spring means formed integrally with the adapter by punching and forming the sheet metal stock of the adapter plate, said shoes or spring means depend from the bottom plane of the adapter plate, yieldingly frictionally engage the brew rails of the related brewing machine and urge the adapter plate up into frictional bearing engagement with a downwardly disposed surface of said machine between and spaced above the rails of the machine.

Still another object and feature of my invention is to provide a flat plate-like adapter of the general character referred to having a vertical through opening to register with a hot water discharge opening in the machine above the adapter and the open top of a brew cone carried by the adapter.

Another object and feature of this invention is to provide an adapter of the character referred to above having adapter orienting means to limit engagement of and position the adapter in and with a related brew machine and cone orienting means to limit engagement of a brew cone therewith and to assure proper positioning of the cone.

Finally, it is an object and feature of my invention to provide an adapter of the general character referred to above which is easy and convenient to use; which is highly effective and dependable in operation; and which permits the selective combining of otherwise incompatible standard structures without modification or otherwise performing work on those structures.

The foregoing and other objects and features of my invention will be apparent and will be fully understood from the following detailed description of one typical preferred form and application of my invention, throughout which description reference is made to the accompanying drawings.

DESCRIPTION OF THE DRAWINGS

FIG. 1 is an exploded perspective view of my adapter and a related brew machine and brew cone;

FIG. 2 is a view similar to FIG. 1 showing the adapter, machine and cone assembled;

FIG. 3 is a top plan view of the adapter;

FIG. 4 is a bottom plan view of the adapter;

FIG. 5 is a front view taken substantially as indicated by line 5—5 on FIG. 3;

FIG. 6 is an enlarged sectional view taken as indicated by line 6—6 on FIG. 5;

FIG. 7 is an enlarged sectional view taken as indicated by line 7—7 on FIG. 5;

FIG. 8 is an enlarged view taken substantially as indicated by line 8—8 on FIG. 1; and FIG. 9 is an enlarged view taken substantially as indicated by line 9—9 on FIG. 2.

DETAILED DESCRIPTION OF THE INVENTION

For the purpose of this disclosure, I have, in FIGS. 1, 2, 8 and 9 of the drawings, shown a typical ten cup coffee brewing machine M and typical brew cones C and C'. It is to be particularly noted and understood that the design and details of construction of the machine M and of the cones C and C' can vary widely without affecting my invention and that the particular machine and cones illustrated are intended to show the nature of those structures and to show certain features thereof which are common to standard machines and cones.

The machine M includes a flat horizontal base 10 with front rear and side edges and defining a horizontal upwardly disposed tray 11. The tray 11 has two laterally spaced circular resistance heating units 12 upon which coffee decanters, such as is shown at A in FIG. 2 of the drawings, can be set.

The machine M next includes an elongate vertical column 14 projecting outwardly from the rear of the base 10.

The machine M next includes a block or box-like head 15 carried by and projecting forward from the upper end portion of the column 14. The head 15 has front, side, top and bottom walls 16, 17, 18 and 19. The bottom wall 19 (see FIGS. 8 and 9 of the drawings) occurs in vertical spaced relationship above the tray 11 and has a vertical through opening 20 which is in vertical alignment with and above one of the heating units 12 on the tray 11 and which therefore aligns with the upper open end of the decanter D supported by the tray 11 or the unit 12; and with a brew cone engaged with the machine.

The head 15 houses and carries a hot water supply means which means can include a tank 21 which holds a proper supply of water to brew ten 6 ounce cups or 60 ounces of coffee. The tank 21 has a downwardly disposed outlet opening or discharge duct 22 which is substantially aligned with, enters and/or projects through the vertical through opening 20 in the bottom wall 19.

The details of construction and operation of the water supply means can vary widely without affecting this invention. It is sufficient to note that the tank 21 of the supply means holds a predetermined volume of hot water sufficient to brew twelve cups of coffee and that manually operable means are included to selectively cause the supply of hot water to drain from the tank, out through the opening or duct 22 at the bottom of the head and into a brew cone engaged with the machine.

Finally, the head C of the machine M includes a pair of laterally spaced, horizontal, parallel brew rails 25 which occur in limited spaced relationship below the bottom wall 19, at opposite sides of the vertical opening 20 and extend fore and aft. The rails 25 can be separate from or can, as shown, be formed integrally on and with the bottom wall 19 of the head. In the case illustrated, the rails 25 have straight laterally inwardly disposed, longitudinally extending and opposing inner edges 26 and flat, horizontal top surfaces 27. The rails 25 have outer edge portions joined integrally with longitudinally extending vertical legs 28 which are integrally joined with and depend from the bottom wall 19 of the head 15.

The lateral displacement of the rails 25 is such that the upper end portion of a twelve cup brew cone C' (shown in dotted lines in FIG. 8 of the drawings) ca be slidably engaged therebetween. The cone C' has an upper laterally outwardly projecting rim flange 29 which is slidably engaged and supported atop the top surfaces 27 of the rails and which are freely slidably engaged between the legs 28 on the rails.

In carrying out my invention, the brew cone C' noted above and which the machine M is designed to engage and support, is not used and is put out of service.

The present invention includes a novel adapter A releasably engageable in and with the bottom wall 19 and the brew rails 25 of the machine M and which cooperatively engages and supports a small eight cup brew cone C.

The brew cone C is designed for and intended to be used in connection with a standard eight cup coffee brewing machine which is similar to but dimensionally smaller than the twelve cup machine M. The cone C is similar to the twelve cup cone C' which the machine M is designed to accept, but is dimensionally smaller in horizontal cross-section than the cone C' and is too small to be engaged with and supported by the brew rails 25 of the machine M.

The cone C is a unitary upwardly opening cuplike unit molded of plastic and is characterized by a substantially square upper end portion 30, a downwardly substantially conical lower portion 30, a downwardly convergent bottom wall 32 with a central vertical discharge opening 33, an outwardly projecting support flange 34 about the upper rim of the upper portion and a manually engageable handle 35 which projects forward and thence downward from the flange 34.

The lower conical portion of the cone C is equal to or slightly greater in vertical extent than the larger twelve cup brew cone C' and is designed to cooperatively receive a volume of ground coffee beans weighing approximately 2 ounces.

In practice, the top of the bottom wall 32 of the cone C is provided with ribs 36 which support a filter paper (not shown) which overlies the opening 33 and supports the bed of ground coffee above the bottom wall to permit coffee brewed in the cone to flow freely across the bottom wall and out through the opening 33.

It is important and it is to be particularly noted that the bed of 2 ounces of ground coffee in the cone C is of substantial vertical extent or depth and is materially deeper than the bed an equal volume of ground coffee could establish in a large twelve cup brew cone, such as in the cone C'.

While the cone C shown and described above has a square upper portion, it will be readily apparent that the precise shape and design of the cone can be varied widely without departing from the spirit of my invention.

The major and minor lateral or radial extent of the flange 34; the working volumetric extent; and the vertical extent of the cone C is substantially standardized and within those working tolerances provided in most standard eight cup brew cones.

The adapter A comprises a flat horizontal body or plate 40 of thin resilient sheet metal, such as stainless steel. The body or plate 40 has front and rear edges and straight parallel opposite side edges 41. The front edge of the plate 40 is formed with an upwardly turned laterally extending, vertical, front adapter or plate orienting flange 42 and the rear edge of the plate is formed with a downwardly turned rear brew cone orienting flange 43.

In practice, the four corners of the plate can be beveled and relieved as shown at 44.

The plate 40 is slightly less in lateral extent than the lateral spacing of the legs 28 on the brew rails 25 of the machine M and the plate is less in longitudinal (fore and aft) extent than the longitudinal extent of the rails 25, whereby the plate can be freely slidably engaged between said legs with the flange-like opposite side edge portions of the plate occurring above and overlying the top surfaces 27 of the rails 25.

The thickness or vertical extent of the plate 40 is notably less than the vertical space between the top surfaces 27 of the rails 25 and the bottom wall 19 of the head 15 of the machine.

The opposite flange-like side edge portions of the plate 40, occurring above the rails 25, are provided with retaining means R to normally yieldingly and frictionally engage the top surfaces of the rails and to urge the top surface of the plate 40 in pressure frictional engagement with the downwardly disposed surface of the bottom wall 19, between the rails.

In the form of the invention illustrated, the retaining means R comprise a pair of elongate longitudinally extending resilient or spring-loaded shoes 50 in the form of belly springs formed integrally with the side edge portions of the plate. The shoes or belly springs 50 depend from the bottom surface of the plate 40 at a distance greater than the vertical distance between the rails 25 and the bottom wall 19 of the head 15 whereby the springs establish yielding pressure and frictional engagement with the top surfaces 27 of the rails 25 and urge and hold the plate up and in pressure frictional engagement with the bottom wall 19 to releasably retain the plate engaged with the rails and said bottom wall. The shoes or belly springs are formed integrally with the plate by a suitable punching and forming operation.

The adapter A next includes a pair of elongate laterally spaced parallel brew cone rails 55 which occur laterally inward of the means R and the brew rails 25 of the machine M to freely slidably receive the upper portion 30 of the brew cone C and to occur below and slidably engage and support the flange 34 of the cone C at the opposite side edges thereof.

The brew cone rails 55 have inner opposing edges 56, flat upwardly disposed flange engaging top surfaces 57 and outer vertical, upwardly projecting legs 58 integrally joined with and depending from the plate 40. The rails 55 are integrally formed with the plate by a suitable punching and forming operation.

Next, and finally, the plate 40 of the adapter A has a substantially centrally located vertical central opening 60 to register with the through opening 20 in the head of the machine and with the water discharge opening or duct 22 of the water supply in the head 15. The opening 60 is arranged so that when the cone C is fully engaged in and with the rails 55, the opening 60 is substantially registered with and occurs above the open top of the cone C whereby water discharged from the head structure flows directly into the cone C.

The upwardly projecting, laterally extending front adapter plate orienting flange 42 engages and stops against the lower edge portion of the front wall 16 or other forwardly disposed surface on the head 15 of the machine M to limit rearward engagement of the plate beneath the head and to thereby properly orient the opening 60 in the plate with the through opening 20 and with the discharge opening or duct 22 of the water supply means.

The downwardly projecting laterally extending rear brew cone orienting flange 43 engages the rear edge of the flange 34 of the brew cone C to limit rearward movement of the cone relative to the adapter and to thereby properly orient the cone below and in substantial vertical alignment with the openings 60 and 20 and with the opening or duct 22.

It is to be noted that due to the reduction in dimensions afforded by the adapter A, the plate 40 is less in fore and aft or longitudinal extent than the rails 25 of the machine M and that its rear end or flange 43 does not engage and stop against the column 14 of the machine or against other structure that might be provided in the machine to stop and limit engagement of a large brew cone C', in the machine. Accordingly, provision of the front, plate-orienting flange 42 is appropriate to assure proper orienting of the plate in the machine and provision of the rear cone-orienting flange 43 is appropriate to prevent the cone C from being moved rearwardly an excessive distance during normal use of the construction, which use includes repeated moving of the cone C into and out of engagement with the adapter A.

From the foregoing, it will be apparent that the adapter A that I provide is a novel structure, the retaining means R and the orienting flanges 42 and 43 of which assure its dependable operation and effective coupling or mounting of a small standard eight cup brew cone C and with a related large standard ten cup coffee brewing machine.

It will be apparent that the adapter A is extremely easy and economical to manufacture and distribute and that it effectively enables the desired and sought after use of small eight cup brew cones with large ten cup coffee brewing machines without having to work on or modify either the cones or the machines.

With the structure here provided, brewers of coffee utilizing standard ten cup machines and eight cup brew cones can advantageously use small quantities of high yield coffee to brew about 25% more coffee than can be brewed when utilizing ten cup brew cones with effective quantities of ground coffee therewith and can thereby attain a savings in costs or an increase in profits of about 25%.

In the foregoing disclosure, reference and apparent emphasis has been made to the use of high yield coffee. In practice, and while advantages are to be gained through the use of such coffee (when my adapter is used), satisfactory results and the brewing of excellent coffee can be attained with the use of some regular ground coffee. That is, ten cups of coffee can be brewed with 2 ounces of rich blends of regular ground coffee in an eight cup brew cone related to a ten cup brew machine. The foregoing is made possible due to the fact that in standard eight cup cones, the bed of ground coffee established therein is deeper than the bed of coffee established in ten cup brew cones and more efficient and/or greater extraction is attained. Further, the standard eight and ten cup brew machines, with their related eight and ten cup brew cones, are designed so as not to result in over extraction and the brewing of what is apt to be a bitter brew. This "designed in" under extraction results in the brewing of close to 25% less coffee than is possible with the volumes of ground coffee used under most favorable conditions. This design in under extraction was apparently arrived at and put into practice many years ago when the quality control, packaging and distribution of ground coffee were not as high, effective and efficient as they are today, and the attaining of most favorable conditions when brewing coffee were too often unattainable. Today, with superior quality control, packaging and distributing of ground coffee, it is rare that "most favorable" conditions are not attained when brewing coffee and full extraction and the production of 25% more brew for each measure of ground coffee cannot be attained.

Another advantage to be attained in and through the use of my invention resides in the fact that eight cup, 1½ or 2 oz. standard "Flite-Packs" of ground coffee can be effectively used. "Flite-Packs" are those pre-measured volumes of coffee deposited in envelopes of filter paper for convenient use and disposal. Ordinary special brew cones with means to hold the flite-pack down must be used since the packs, when used, tend to inflate with steam and when used in standard brew cones, float up in the cones which inhibits effective extraction. With the structure that I provide, when a standard flite-pack is urged and set in a standard eight cup brew cone, the edges of the pack are caused to turn up adjacent the sides of the cone and to engage and stop against the bottom of the adapter when the cone is related thereto. The adapter, therefore, serves to hold the flite-pack down in the cone and prevents its rising and floating out of proper position in the cone.

While the above feature and advantage afforded by my invention is collateral to the mere basic aspects of the invention, it is of sufficient moment to merit particular consideration.

Having described only one typical form and application of my invention, I do not wish to be limited to the specific details herein set forth, but wish to reserve to myself any modifications and/or variations which might appear to those skilled in the art and which fall within the scope of the following claims.

Having described my invention, I claim:

1. A brew cone adapter engageable with a bottom surface of a water dispensing head of a coffee brewing machine to underlie a water discharge opening in that head and engageable with and between a pair of elongate laterally spaced parallel horizontal brew rails carried by the head below said surface and to slidably receive and support the upper rim flange of an upwardly opening cup-like brew cone, the lateral extent of which is less than the lateral space between said brew rails; said adapter includes a thin, flat, horizontal substantially rectangular plate with substantially flat, upper and lower surfaces, front and rear ends and laterally spaced parallel opposite side edge portions to overlie the brew rails of a related coffee brewing machine, a pair of elongate laterally spaced parallel brew cone rails spaced laterally inwardly of said side edge portions and depending from the lower surface of the plate to slidably engage below and to support the rim flange of a related brew cone, and a center opening in the plate to register with the water discharge opening of a related brew machine and to occur above the open top of a related brew cone.

2. The adapter set forth in claim 1 which further includes resilient retaining means at and projecting down from the side edge portions of the plate to yieldingly frictionally engage the brew rails and to yieldingly urge the plate up into frictional engagement with the bottom surface of the head of a related coffee brewing machine.

3. The adapter set forth in claim 1 which further includes a laterally extending cone orienting flange at the rear end of the plate to engage and stop rearward movement of a related brew cone slidably engaged on said brew cone rails.

4. The adapter set forth in claim 3 which further includes a laterally extending plate orienting flange at the front end of the plate to engage a part of the head of a related coffee brewing machine to limit rearward movement of the plate relative to the brew rails and water discharge opening.

5. The adapter set forth in claim 2 which further includes a laterally extending cone orienting flange at the rear end of the plate to engage and stop rearward movement of a related brew cone slidably engated on said brew cone rails.

6. The adapter set forth in claim 5 which further includes a laterally extending plate orienting flange at the front end of the plate to engage a part of the head of a related coffee brewing machine to limit rearward movement of the plate relative to the brew rails and water discharge opening.

7. The adapter set forth in claim 1 which further includes a laterally extending plate orienting flange at the front end of the plate to engage a part of the head of a related coffee brewing machine to limit rearward movement of the plate relative to the brew rails and water discharge opening.

* * * * *